US012596502B2

(12) United States Patent
Komori et al.

(10) Patent No.: US 12,596,502 B2
(45) Date of Patent: Apr. 7, 2026

(54) ELECTRONIC DEVICE AND ELECTRONIC DEVICE CONTROL METHOD

(71) Applicant: Hitachi Vantara, Ltd., Yokohama (JP)

(72) Inventors: Takemasa Komori, Tokyo (JP); Masao Ogihara, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 0 days.

(21) Appl. No.: 18/882,180

(22) Filed: Sep. 11, 2024

(65) Prior Publication Data

US 2025/0278214 A1 Sep. 4, 2025

(30) Foreign Application Priority Data

Mar. 4, 2024 (JP) ................................. 2024-031874

(51) Int. Cl.
G06F 3/06 (2006.01)

(52) U.S. Cl.
CPC .......... G06F 3/0656 (2013.01); G06F 3/0653 (2013.01); G06F 3/0679 (2013.01); *G06F 2212/1032* (2013.01)

(58) Field of Classification Search
CPC .......... G06F 2212/1032; G06F 3/0653; G06F 3/0656; G06F 3/0679
USPC ....................................................... 711/103
See application file for complete search history.

(56) References Cited

U.S. PATENT DOCUMENTS

| 9,431,061 | B1 * | 8/2016 | Slik | .......................... | G11B 5/09 |
| 2007/0070542 | A1 * | 3/2007 | Suzuki | .................. | G11B 19/04 |
| 2008/0221789 | A1 * | 9/2008 | Oono | ..................... | G01C 21/26 |
| | | | | | 701/532 |

FOREIGN PATENT DOCUMENTS

JP 2005-182773 A 7/2005

* cited by examiner

*Primary Examiner* — Hashem Farrokh
(74) *Attorney, Agent, or Firm* — Foley & Lardner LLP

(57) ABSTRACT

Provided is an electronic device such as a storage apparatus coping with, with a simple configuration, a situation where data transfer cannot be performed because of an occurrence of an abnormality in the connection using a connector or the like, at the time of occurrence of a shock due to an earthquake or the like.
The present invention is applied to an electronic device in which a drive that stores data and a control board having disposed thereon a controller that controls data transfer between the drive and another apparatus are connected via a connector. The electronic device includes: an acceleration sensor; and a vibration sensing processing section that controls a state of communication between the drive and the controller to temporarily stop data transfer performed by the drive, for a period during which a possibility of occurrence of an ongoing abnormality exists in the connection using the connector or the like, when the acceleration sensor has sensed an acceleration of exceeding an upper-limit threshold, and causes the temporarily stopped data transfer to resume when the acceleration sensor has sensed an acceleration of equal to or lower than a lower-limit threshold.

8 Claims, 9 Drawing Sheets

A

ACCELERATION
(m/s²)

TH1 UPPER-LIMIT
THRESHOLD

TH2 LOWER-LIMIT
THRESHOLD

TIME
(sec)

B

X-DIRECTION DISPLACEMENT
(mm)

$\alpha 2$ $\alpha 1$

TIME
(sec)

C

CHARACTERISTICS IMPEDANCE
(Ω)

$\beta 1$ (CHARACTERISTICS IMPEDANCE
AT TIME WHEN DISPLACEMENT
IS ZERO) + N%

$\alpha 2$        $\alpha 3$

DISPLACEMENT
(mm)

D 111        133        130

110 y
x

ACCELERATION
(m/s²)

TH1 UPPER-LIMIT
THRESHOLD

TH2 LOWER-LIMIT
THRESHOLD

A

TIME
(sec)

Y-DIRECTION DISPLACEMENT
(mm)

$\alpha2$
$\alpha1$

B

TIME
(sec)

CHARACTERISTICS IMPEDANCE (Ω)

(CHARACTERISTICS IMPEDANCE
AT TIME WHEN DISPLACEMENT
IS ZERO) + N%

$\beta1$

C $-\alpha3$　$-\alpha2$　　　　$\alpha2$　$\alpha3$

DISPLACEMENT
(mm)

111　　133　　130

D

110

F I G .  8

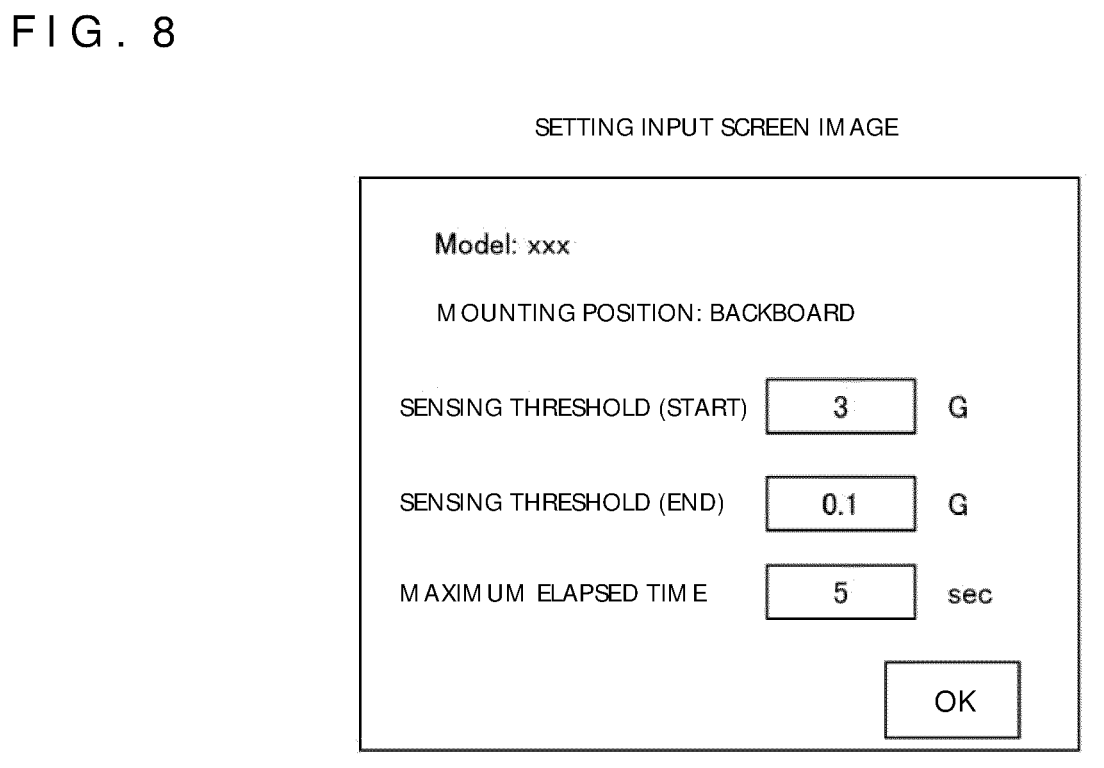

SETTING INPUT SCREEN IMAGE

Model: xxx

MOUNTING POSITION: BACKBOARD

SENSING THRESHOLD (START)    | 3 |    G

SENSING THRESHOLD (END)    | 0.1 |    G

MAXIMUM ELAPSED TIME    | 5 |    sec

| OK |

ELECTRONIC DEVICE AND ELECTRONIC DEVICE CONTROL METHOD

BACKGROUND OF THE INVENTION

1. Field of the Invention

The present invention relates to an electronic device and an electronic device control method.

2. Description of the Related Art

As one type of electronic device, various types of storage apparatus that store large volumes of data have been developed. Storage apparatuses typically use solid state drives (SSDs) or hard disk drives (HDDs).

These storage apparatuses ensure required recording capacities by combining a plurality of drives such as SSDs or HDDs, and include controllers that control the plurality of drives.

A plurality of drives and controllers are connected to a PCB (Printed circuit board) called a backboard via connectors. Note that a plurality of PCBs of the controller also are prepared in some cases in order to give an apparatus redundancy.

In a case where a plurality of drives and control boards are connected via connectors, there is a possibility that an abnormality occurs in data transfer via the connectors in a case where a shock due to an earthquake or the like is applied during the data transfer.

Specifically, although a connector has a structure of mechanically avoiding disconnection due to a certain degree of vibration, a vibration causes chattering, and accordingly the data transfer state becomes unstable in some cases. Particularly, in recent years, there has been a tendency that a transfer rate at the time of data transfer increases, and a connector itself has been miniaturized. Accordingly, a case increases where correct data transfer cannot be performed at the time of occurrence of a vibration.

In a case where an abnormality has occurred during data transfer, and the data transfer is interrupted in a storage apparatus, it is necessary to check entire recorded data since it cannot be known which part of data is lost. Because of this, each storage apparatus requires a very long time until the completion of data transfer. In addition, there can also be a case where the data transfer is not recovered automatically depending on the occurrence status of an abnormality. Accordingly, it is preferable if storage apparatuses cope with a shock such as an earthquake.

JP-2005-182773-A describes a technology in which an acceleration sensor detects a prediction of possibility of receiving shock received by an information processing apparatus, the shock being due to a fall or the like. According to the technology described in JP-2005-182773-A, a sector where transfer is being performed, and where an influence of a shock due to a fall or the like may be received is determined. Then, information of the sector is caused to be written in a register, and when the transfer is resumed, the transfer is resumed starting from data stored on the register.

SUMMARY OF THE INVENTION

According to the technology described in JP-2005-182773-A, being in the middle of falling of the apparatus is sensed, and the data is stored on the register before the falling apparatus hits a floor or the like and receives a shock.

However, the technology described in JP-2005-182773-A cannot cope with a shock that occurs without a sign as in a case of earthquake.

Conventionally, in order to cope with a shock such as an earthquake, there has been such a structure of a storage apparatus that a storage apparatus is arranged via a seismic isolation apparatus so as to be prevented from shaking even if an earthquake occurs. However, if such a seismic isolation apparatus is used, there is a problem that the configuration becomes undesirably expensive because the scale of the storage apparatus becomes large.

In view of these matters, an object of the present invention is to provide an electronic device and an electronic device control method that make it possible, with a simple configuration, to cope with a situation where data transfer cannot be performed in an electrical device such as a storage apparatus at the time of occurrence of a shock such as an earthquake.

In order to solve the problems described above, for example, configurations described in claims are adopted.

The present application includes a plurality of means for solving the problems described above, and one example thereof is an electronic device having a configuration in which a drive that stores data and a control board having disposed thereon a controller that controls data transfer between the drive and another device are connected to each other via a connector, the electronic device including: an acceleration sensor that senses occurrence of a vibration; and a vibration sensing processing section that causes the controller to control a state of communication between the drive and the controller to temporarily stop data transfer performed between the drive and the controller, when the acceleration sensor has sensed an acceleration exceeding an upper-limit threshold, and causes the temporarily stopped data transfer to resume when the acceleration sensor has sensed an acceleration of equal to or lower than a lower-limit threshold.

According to the present invention, it is possible to effectively prevent occurrence of a failure of data transfer due to occurrence of a shock such as an earthquake by controlling a state of communication on the basis of a vibration status sensed by an acceleration sensor.

Problems, configurations, and advantages other than those described above are made clear by the following explanation of an embodiment.

BRIEF DESCRIPTION OF THE DRAWINGS

FIG. 8 is a figure depicting an example of a threshold setting screen according to the embodiment of the present invention.

DETAILED DESCRIPTION OF THE PREFERRED EMBODIMENTS

Hereinbelow, an electronic device and an electronic device control method according to an embodiment (hereinafter, called the "present example") of the present invention are explained with reference to the attached figures.

Configuration of Electronic Device

Figure 1:
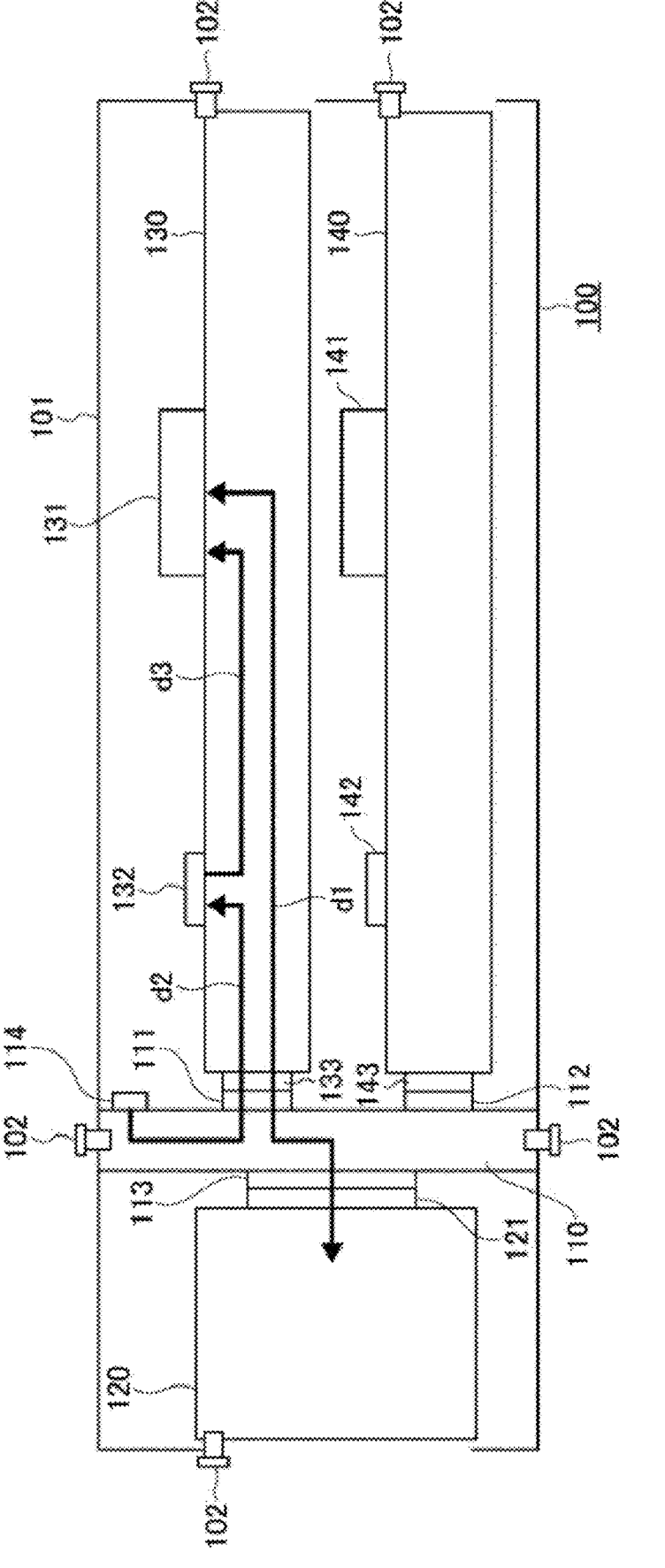
FIG. 1 is a side view of the configuration of an electronic device according to an embodiment of the present invention.
Figure 2:
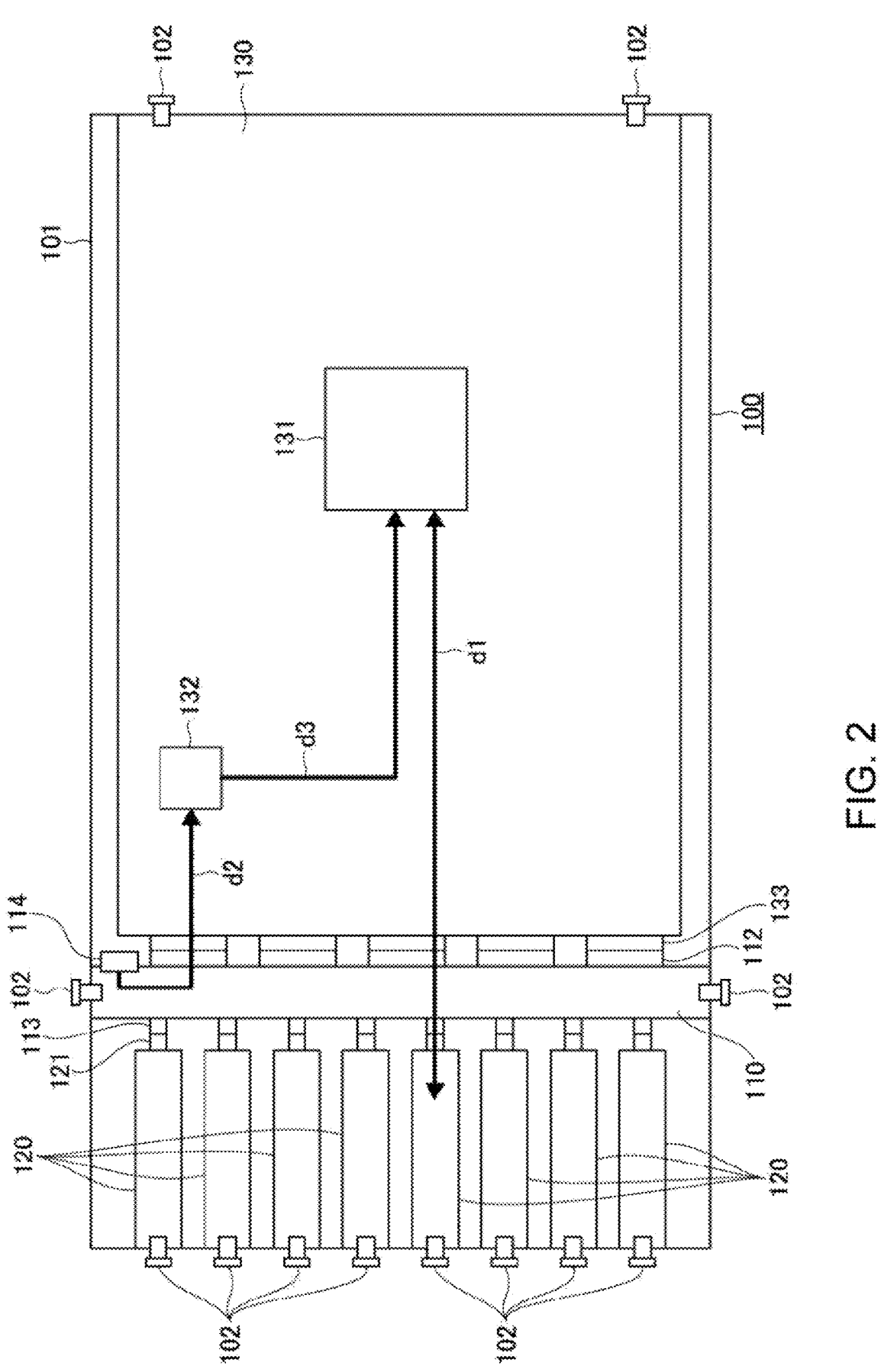
FIG. 2 is a top view of the configuration of the electronic device according to the embodiment of the present invention.

FIG. 1 and FIG. 2 depict the configuration of an electronic device 100 in the present example.

FIG. 1 is a side-view configuration diagram of the electronic device 100, and FIG. 2 is a top-view configuration diagram of the electronic device 100.

As depicted in FIG. 2, the electronic device 100 is a storage apparatus including a plurality of drives 120 inside a housing 101. Whereas the electronic device 100 includes eight drives 120 in the example in FIG. 2, the number of the drives 120, which is eight, is an example, and the number of the drives 120 is not necessarily eight.

For example, the drives 120 are configured using SSDs, and large volumes of data are stored on recording media (semiconductor memories) built in the SSDs.

As depicted in FIG. 1, data transfer between a recording medium in each drive 120 and an external device is controlled by controllers 131 and 141 disposed on control boards 130 and 140.

For example, as depicted in FIG. 1 and FIG. 2, the exchange of data d1 is performed between the controller 131 and the drive 120, and the data transfer between the controller 131 and the drive 120 is controlled. For example, the controllers 131 and 141 are configured using central processing units (CPUs) and memories.

The two controllers 131 and 141 are prepared for giving the electronic device 100 redundancy. Either one of them executes data transfer control, and the other of them stands by in preparation for a situation where the control cannot be executed by the one of them occurs.

Whereas FIG. 2 depicts the flow of the data d1 between the controller 131 and one drive 120, the controller 131 actually controls all the arranged drives 120.

Note that, in FIG. 1 and FIG. 2, arrows represent data flows on the control board 130, which is one of the control boards, and data flows of the control board 140, which is the other of the control boards, are omitted. It is needless to say that data flows that are seen when the control board 140 is in operation are similar to data flows on the control board 130.

The plurality of drives 120 and the two control boards 130 and 140 are connected to a backboard 110 in the housing 101 via respective connectors.

That is, a connector 121 is attached to each drive 120, and the connector 121 is fit into a connector 113 on the side of the backboard 110. In addition, connectors 133 are attached to the control board 130, and the connectors 133 are fit into connectors 111 on the side of the backboard 110. Similarly, connectors 143 are attached to the control board 140, and the connectors 143 are fit into connectors 112 on the side of the backboard 110.

Thereby, each drive 120 is electrically connected with the controllers 131 and 141 of the two control boards 130 and 140.

In addition, respective ends of each drive 120 and the two control boards 130 and 140 are directly fixed to the housing 101 by screws 102. In addition, the backboard 110 also is directly fixed to the housing 101 by screws 102.

Then, in the electronic device 100 in the present example, an acceleration sensor 114 is attached to the backboard 110. For example, the acceleration sensor 114 is attached to an end of the backboard 110, and is disposed near a portion where the backboard 110 contacts the housing 101.

The acceleration sensor 114 attached to the backboard 110 is a sensor that detects the acceleration applied to the electronic device 100. Acceleration detection data d2 sensed by the acceleration sensor 114 is supplied to vibration sensing processing sections 132 and 142 disposed on the control boards 130 and 140, respectively.

In the electronic device according to the present example, the vibration sensing processing sections 132 and 142 disposed respectively on the control boards 130 and 140 are circuits that perform vibration sensing process. The vibration sensing processing sections 132 and 142 are chips what are called microcomputers, and also perform other operation control of the control boards 130 and 140. For example, the vibration sensing processing sections 132 and 142 also perform power management of the respective control boards 130 and 140.

The vibration sensing processing sections 132 and 142 give a notification d3 to the controllers 131 and 141 when the acceleration detection data d2 from the acceleration sensor 114 has exceeded a set threshold. The controllers 131 and 141 having received the notification change the state of communication of each drive 120. Details of the control process based on acceleration detection are mentioned later.

[Configuration for Control Based on Acceleration Detection]

Figure 3:
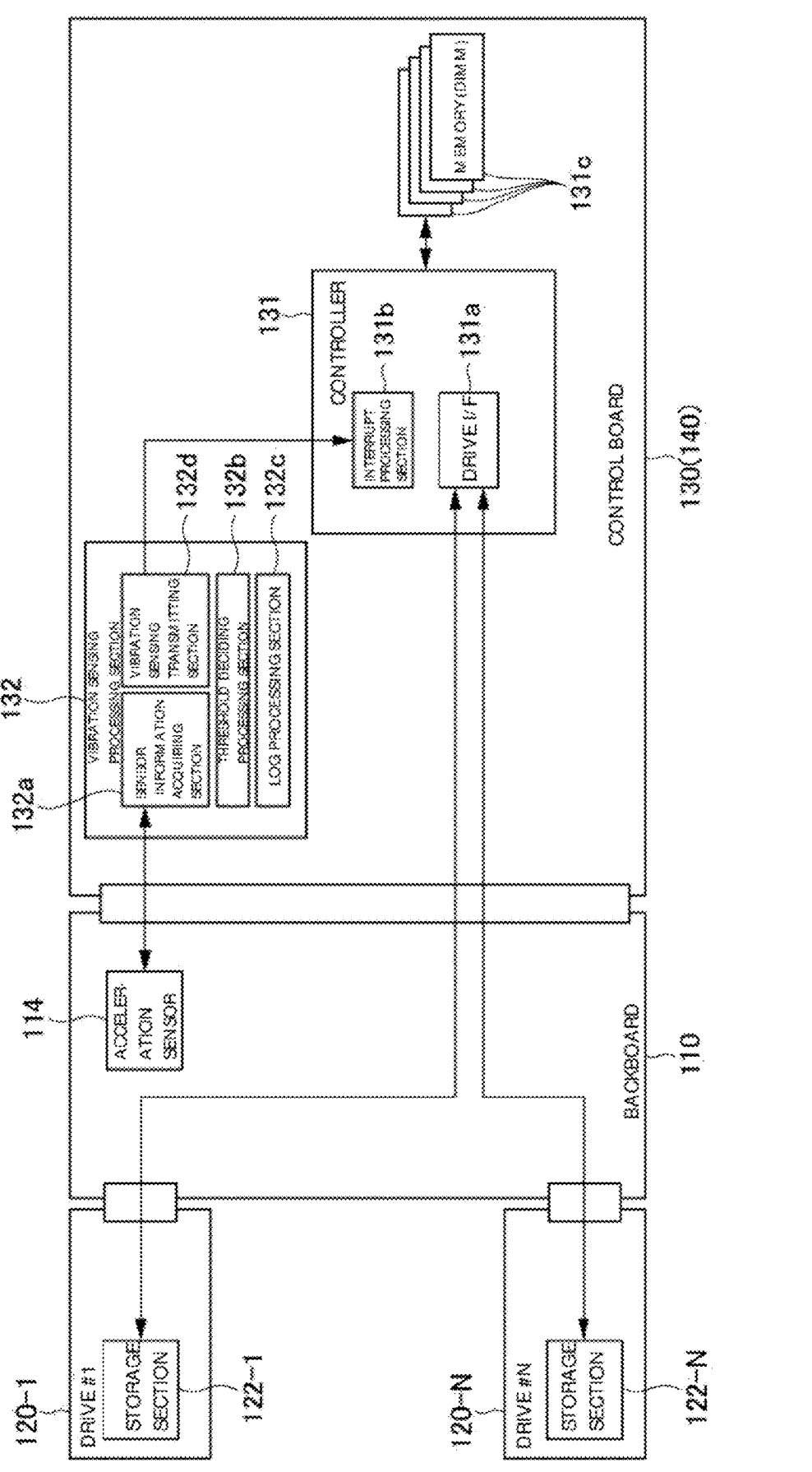
FIG. 3 is a block diagram depicting an apparatus configuration example of the electronic device according to the embodiment of the present invention.

FIG. 3 depicts a configuration for performing a process at the control board 130 on the basis of the acceleration detection data from the acceleration sensor 114. Note that whereas the following explanation depicts the configuration and a process performed by the control board 130, which is one of the control boards, the same applies also to the configuration of the control board 140, which is the other of the control boards.

The vibration sensing processing section 132 includes a sensor information acquiring section 132*a*, a threshold deciding processing section 132*b*, a log processing section 132*c*, and a vibration sensing transmitting section 132*d*.

The controller 131 includes a drive interface (drive I/F) 131*a* and an interrupt processing section 131*b*. In addition, the controller 131 is connected with a memory 131*c*. For example, as the memory 131*c*, a memory module called a dual inline memory module (DIMM) in which a plurality of semiconductor memory chips are mounted on a printed board is used. Then, the memory 131*c* is used as a cache memory.

Drives 120-1 to 120-N (N is an integer: the number of drives mounted on the electronic device 100) include storage sections 122-1 to 122-N, respectively.

The sensor information acquiring section 132*a* of the vibration sensing processing section 132 performs a process of acquiring the acceleration detection data from the acceleration sensor 114.

The threshold deciding processing section 132*b* performs a threshold deciding process of deciding whether or not an acceleration acquired by the sensor information acquiring section 132*a* has exceeded thresholds. The thresholds used for the decision include an upper-limit threshold and a lower-limit threshold. Although appropriate values are set in advance as the upper-limit threshold and the lower-limit threshold, the upper-limit threshold and the lower-limit threshold can be modified by a threshold setting process mentioned later.

The log processing section 132*c* executes a log process of controlling data transfer of the drive 120 by the controller 131.

In a case where the threshold deciding processing section 132*b* decides that the acceleration has exceeded a threshold, the vibration sensing transmitting section 132*d* transmits a vibration sensing notification based on the log process at the log processing section 132*c* to the interrupt processing section 131*b* of the controller 131.

When receiving the vibration sensing notification from the vibration sensing transmitting section 132*d*, the interrupt processing section 131*b* of the controller 131 changes the state of communication of the respective drives 120-1 to 120-N, which is set by the controller 131.

The drive I/F 131*a* of the controller 131 is in the state of communication set by the controller 131, and executes communication with the respective drives 120-1 to 120-N.

Note that data written in the storage sections 122-1 to 122-N of the drives 120-1 to 120-N, and data read out from the storage sections 122-1 to 122-N can be temporarily stored on the memory 131*c* connected to the controller 131.

[Control Process at Time of Occurrence of Vibration]

Figure 4:
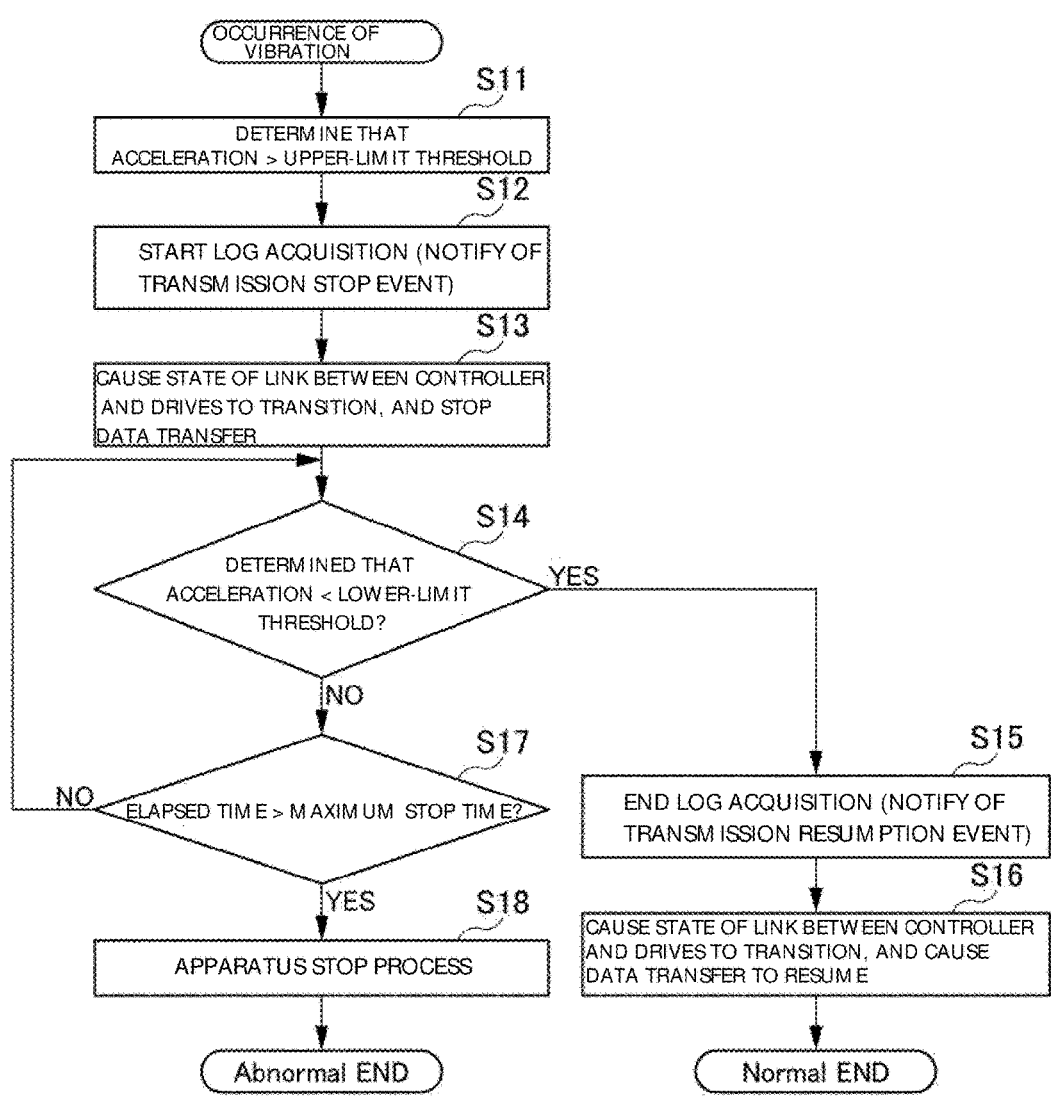
FIG. 4 is a flowchart depicting an example of a control process of the electronic device according to the embodiment of the present invention.

FIG. 4 is a flowchart depicting the control based on acceleration detection by the vibration sensing processing section 132.

In a case where the threshold deciding processing section 132*b* has determined that the acceleration has exceeded the upper-limit threshold, the vibration sensing processing section 132 starts a process to be performed at the time of occurrence of a vibration (Step S11).

When the process to be performed at the time of occurrence of a vibration is started, the vibration sensing transmitting section 132*d* starts log acquisition at the log processing section 132*c*, and notifies the controller 131 of a transmission stop event (Step S12).

The controller 131 that received the transmission stop event notified at Step S12 performs a process of causing the state of link between the controller 131 and the drive 120 to transition, and temporarily stopping data transfer (temporary stop process) (Step S13).

Then, in the vibration sensing processing section 132, the threshold deciding processing section 132*b* determines whether or not the acceleration has become smaller than the lower-limit threshold (Step S14).

In a case where it is determined at Step S14 that the acceleration has become smaller than the lower-limit threshold (YES at Step S14), the vibration sensing processing section 132 ends the log acquisition at the log processing section 132*c*, and notifies the controller 131 of a transmission resumption event (Step S15).

The controller 131 having received the transmission resumption event causes the state of link between the controller 131 and the drive 120 to transition, and causes the data transfer to resume (Step S16). Thereby, the process to be performed at the time of occurrence of a vibration ends. The end in a state where the resumption at Step S16 has been performed is an end at the time of a normal state.

Note that transfer-target data from stopping of the data transfer at Step S13 until resumption of the data transfer at Step S16 is temporarily stored on the memory 131*c* connected to the controller 131. Accordingly, when the data transfer is resumed in step S16, the data transfer is executed using the data cached in the memory 131*c*.

In addition, when the acceleration is not smaller than the lower-limit threshold at Step S14 (NO at Step S14), the vibration sensing processing section 132 determines whether or not the elapsed time since the notification of the transmission stop event at Step S12 has exceeded preset maximum stop time (Step S17). For example, the maximum stop time is set on the basis of an amount of data that can be cached in the memory 131*c*, and is approximately several seconds.

When it is determined at Step S17 that the maximum stop time has not been exceeded (NO at Step S17), the vibration sensing processing section 132 returns to the determination at Step S14.

Then, when it is determined at Step S17 that the maximum stop time is exceeded (YES at Step S17), the vibration sensing processing section 132 performs a process of stopping the drive 120 (Step S18), and ends the process to be performed at the time of occurrence of a vibration. The end in a state where the stop process at Step S18 has been performed is an end at the time of an abnormal state. At Step S18, instead of the vibration sensing processing section 132, the controller 131 may stop the drive 120. In this case, the vibration sensing processing section 132 notifies the controller 131 of a stop process event, and the controller 131 having received the event stops the drive 120.

Figure 5:
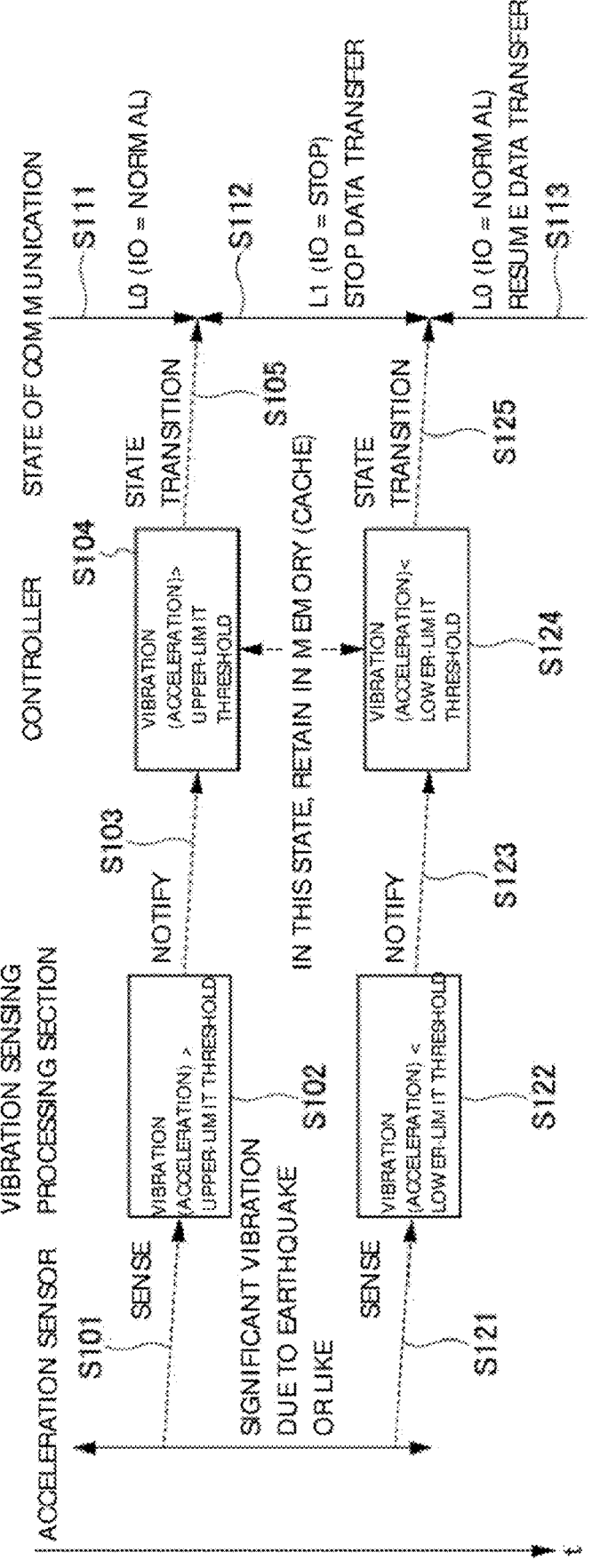
FIG. 5 is a sequence diagram depicting a setting example of a state of communication according to the embodiment of the present invention.

FIG. 5 is a sequence diagram depicting a setting example of the state of communication. It is assumed here that the acceleration sensor 114 has sensed a significant vibration due to occurrence of an earthquake or the like.

When the acceleration sensor 114 senses a significant vibration (Step S101), and an acceleration sensed by the vibration sensing processing section 132 exceeds the upper-limit threshold (Step S102), the vibration sensing processing section 132 gives a notification to the controller 131 (Step S103). The controller 131 having received the notification that the acceleration has exceeded the upper-limit threshold (Step S104) gives a state-of-communication transition instruction (Step S105).

According to the state-of-communication transition instruction given at Step S105, the controller 131 changes the state of communication of the drive 120 from a normal state (S111) to a stop state (S112). At this time, there is a possibility that normal data transfer cannot be performed because of an occurrence of abnormalities such as a variation of the characteristics impedance or chattering due to a change in the contact state of the connectors caused by a propagation, with a slight delay, of a significant vibration due to an earthquake or the like to the connectors 121 and 113, for example. During the stop state at Step S112, data transfer between the controller 131 and the drive 120 is stopped temporarily. Data during this stop state is cached in the memory 131*c* connected to the controller 131.

Then, when the acceleration sensor 114 senses an attenuation of the vibration due to the damping of the vibration (Step S121), and the acceleration sensed by the vibration sensing processing section 132 becomes smaller than the lower-limit threshold (Step S122), the vibration sensing processing section 132 gives the controller 131 a notification (Step S123). The controller 131 having received the notification that the acceleration has become smaller than the lower-limit threshold (Step S124) gives a state-of-communication transition instruction (Step S125).

According to the state-of-communication transition instruction given at Step S125, the controller 131 changes the state of communication of the drives 120 from the stop state (S112) to the normal state (S113). As a result of the change to the normal state, the data transfer by the drives 120 is resumed.

As explained above, according to the electronic device 100 in the present example, at the time of temporary occurrence of a vibration due to an earthquake or the like, data transfer at the drives 120 gets stopped automatically by the vibration being sensed, and is resumed automatically when the vibration is damped. Note that when the end process at the time of an abnormal state at Step S18 in the flowchart in FIG. 4 is performed, a resumption process which is similar to those performed in conventional techniques is necessary. It should be noted that, in this case also, by analysis of data cached in the memory 131c connected to the controller 131, it can be determined to which point the data transfer has been performed, and it becomes possible to perform a resumption process which is more appropriate and takes a shorter time than in conventional techniques.

[Example of Setting of Upper-Limit Threshold and Lower-Limit Threshold]

Next, an example of setting of the upper-limit threshold and the lower-limit threshold to be used at the time of occurrence of a vibration is explained.

Figure 6:
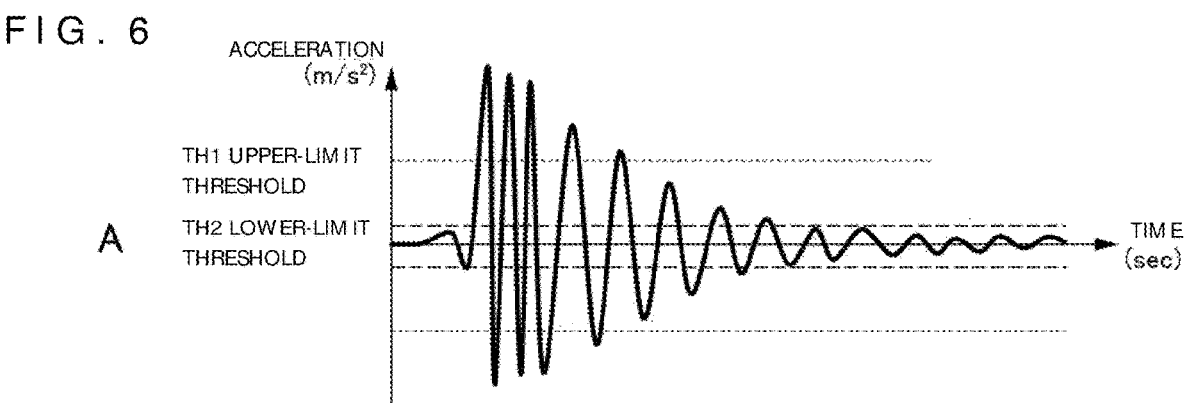
FIG. 6 is a figure depicting an example of acceleration and characteristics impedance in a case where a vibration is applied in the X direction to a connector according to the embodiment of the present invention.
Figure 6:
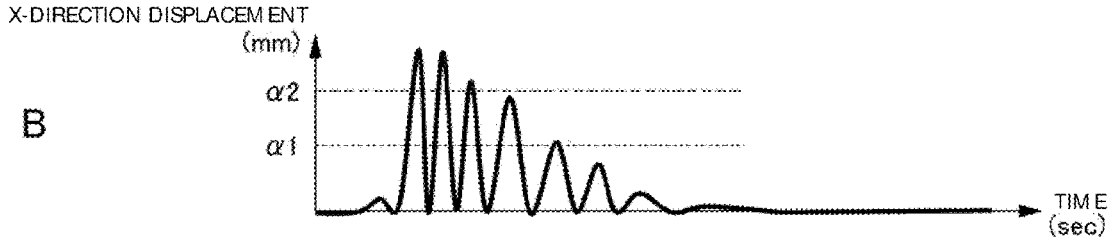
Figure 6:
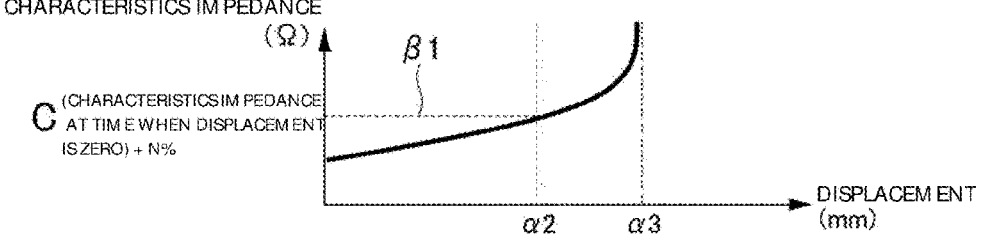
Figure 6:
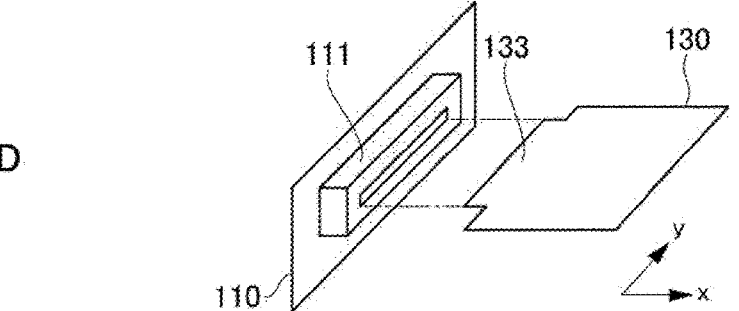

FIG. 6 depicts an example of a case where a vibration is applied in the X direction to a connection portion between a connector 111 attached to the backboard 110 of the electronic device 100 and a connector 133 on the side of the control board 130 in the present example.

Figure 7:
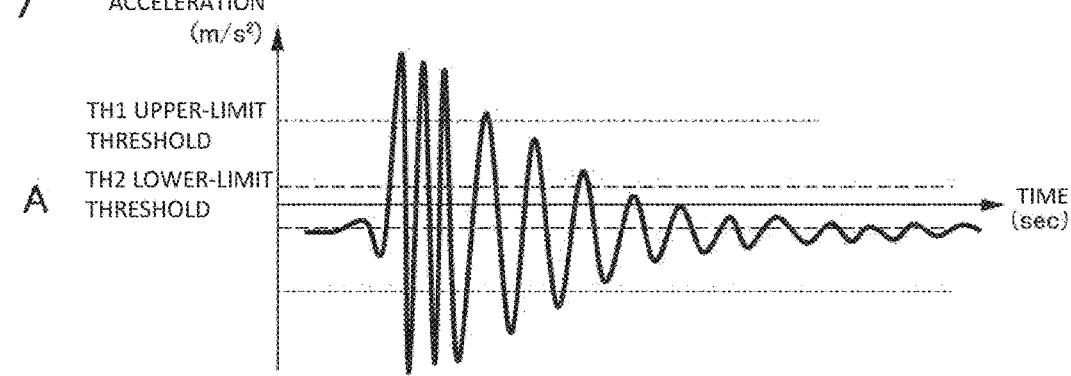
FIG. 7 is a figure depicting an example of acceleration and characteristics impedance in a case where a vibration is applied in the Y direction to a connector according to the embodiment of the present invention.
Figure 7:
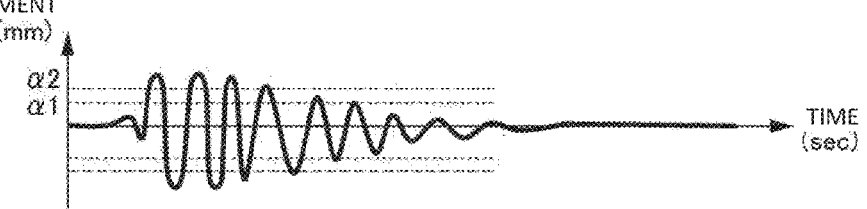
Figure 7:
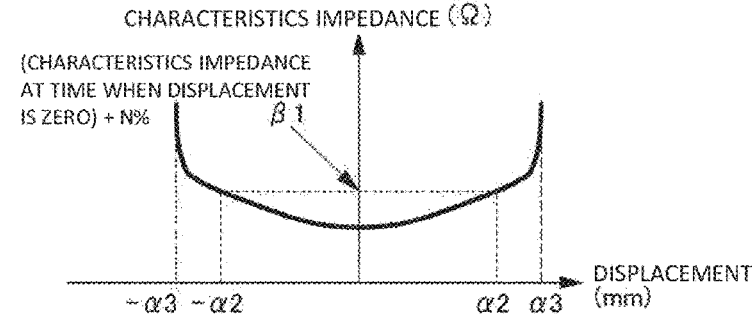
Figure 7:
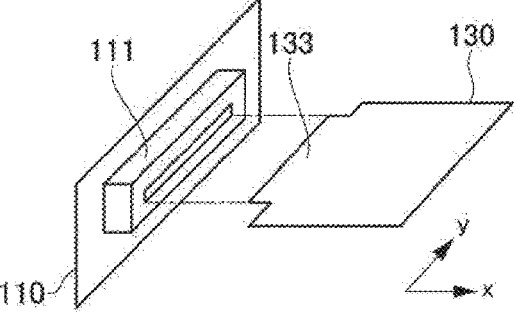

In addition, FIG. 7 depicts an example of a case where a vibration is applied to the same connection portion in the Y direction, which is 90°-perpendicular to the X direction. The X direction and the Y direction are illustrated in FIG. 6D and FIG. 7D.

The vertical axes in FIG. 6A and FIG. 7A represent the accelerations of the vibrations applied to the electronic device 100, and the horizontal axes represent time. In addition, the vertical axes in FIG. 6B and FIG. 7B represent displacement amounts (mm) in the X direction and the Y direction in a case where the vibrations are applied to the electronic device 100, and the horizontal axes represent time.

As depicted in FIG. 6B and FIG. 7B, it can be known that the displacement amounts in the respective directions increase as the accelerations increase.

In FIG. 6A and FIG. 7A, the upper-limit threshold is written as TH1, and the lower-limit threshold is written as TH2. The upper-limit threshold TH1 in FIG. 6A and FIG. 7A corresponds to a value $\alpha2$ to be used when the displacement amounts in the respective directions in FIG. 6B and FIG. 7B are relatively large. In addition, the lower-limit threshold TH2 in FIG. 6A and FIG. 7A corresponds to a value $\alpha1$ to be used when the displacement amounts in the respective directions in FIG. 6B and FIG. 7B are relatively small.

FIG. 6C and FIG. 7C depict the relationships between the displacement amounts (horizontal axes) in the respective directions and the characteristics impedance (vertical axes) of the connectors, and the characteristics impedance increases as the displacement amounts increase to $\alpha2$ and then to $\alpha3$. The value of the displacement amount $\alpha3$ is a displacement amount at which the connectors get disengaged.

Here, the values of the displacement amounts $\alpha1$ and $\alpha2$ are set such that a characteristics impedance value $\beta1$, which is obtained by tolerating change to predetermined N % in the characteristics impedance value at the time of displacement amounts being zero, corresponds to the displacement amount $\alpha2$. The impedance N % at the time of displace amounts being zero is the upper limit of the displacement amounts, where transmission performance can be ensured by transmission analysis.

Thereby, it becomes possible for the vibration sensing processing section 132 to appropriately set the upper-limit threshold and the lower-limit threshold to such values that errors do not occur in data transfer due to a vibration at the time of occurrence of an earthquake.

[Example of Screen for Setting Upper-Limit Threshold and Lower-Limit Threshold]

Note that it is preferable if the upper-limit threshold and the lower-limit threshold are preset to appropriate values by the process mentioned above, but may be allowed to be modified on a setting screen or the like of the electronic device 100.

FIG. 8 depicts an example of a screen for setting the upper-limit threshold and the lower-limit threshold.

As depicted in FIG. 8, a user is allowed to input a sensing threshold (start) which is the upper-limit threshold, and a sensing threshold (end) which is the lower-limit threshold on the setting screen.

In the example in FIG. 8, the sensing threshold (START) which is the upper-limit threshold is set to 3 G (G is the unit of gravitational acceleration), and the sensing threshold (END) which is the lower-limit threshold is set to 0.1 G. Since there is a possibility that the upper-limit threshold and the lower-limit threshold change depending on the installation position of the acceleration sensor 114, the installation position of the acceleration sensor is also displayed on the setting screen in FIG. 8. That is, the installation position is displayed as "MOUNTING POSITION: BACKBOARD" on the setting screen.

In addition, it is made possible to modify also the maximum elapsed time on the setting screen. The maximum elapsed time is the maximum stop time determined at Step S17 in the flowchart in FIG. 4, and is determined by the storage capacity of the memory 131c and the like.

In this manner, by making it possible to modify the upper-limit threshold and lower-limit threshold of an acceleration, the electronic device in the present example can cope with various installation conditions. In addition, since the maximum elapsed time (maximum stop time) can be modified, it becomes possible to set appropriate stop time depending on conditions such as memory capacity or a data transfer speed.

[Another Example of Installation Position of Acceleration Sensor]

In the example depicted in FIG. 1 and FIG. 2, the acceleration sensor 114 is attached to the backboard 110. By providing the acceleration sensor 114 to the backboard 110, there are provided advantages of enabling a plurality of the control boards 130 and 140 to share the acceleration sensor 114, and enabling a vibration externally applied to the housing 101 to be appropriately sensed. However, acceleration sensors may be installed at other positions.

Figure 9:
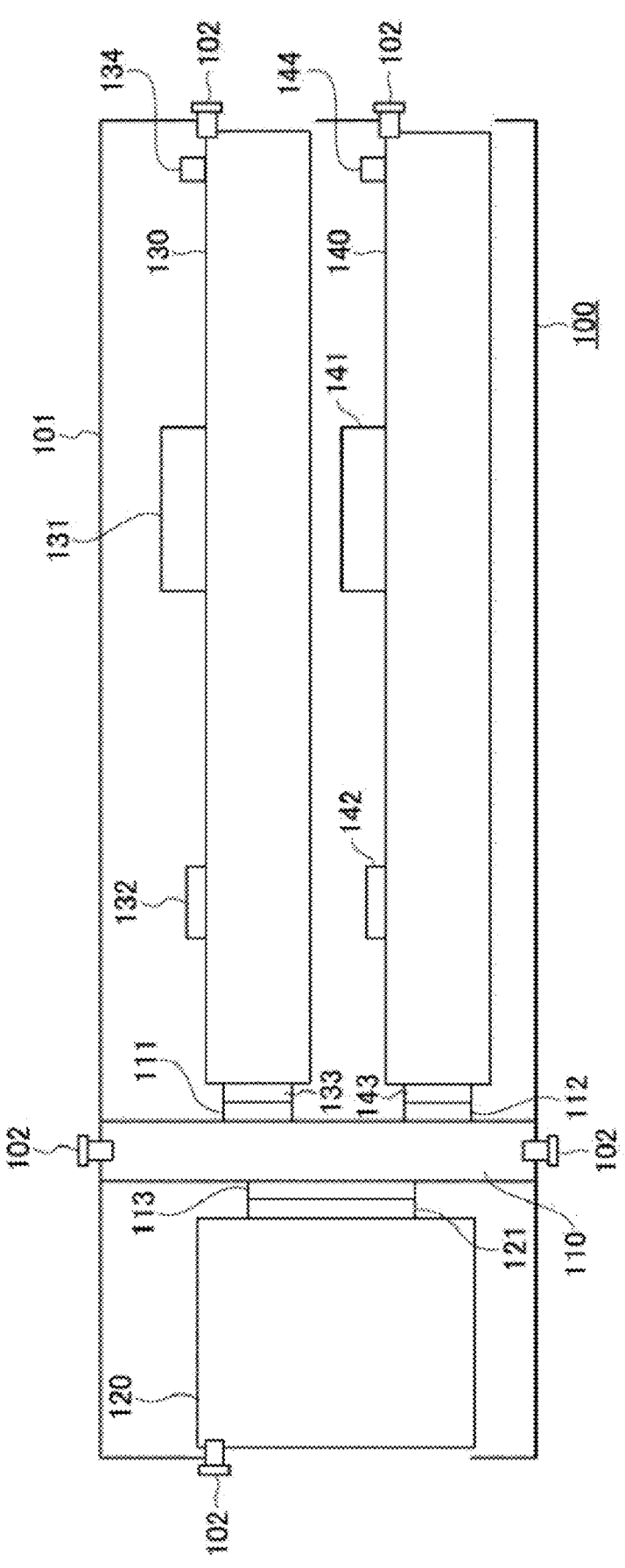
FIG. 9 is a side view of the configuration of the electronic device according to a modification example of the embodiment of the present invention.

FIG. 9 depicts an example in which acceleration sensors are attached to the control boards 130 and 140.

In the example in FIG. 9, the control board 130, which is one of the control boards, includes an acceleration sensor 134, and the control board 140, which is the other of the control boards, includes an acceleration sensor 144.

For example, it is preferable if the respective acceleration sensors 134 and 144 are provided at portions to which external vibrations are transferred easily, and which are near portions where the control boards 130 and 140 are fixed to the housing 101 by the screws 102.

Thereby, it becomes possible for the vibration sensing processing sections 132 and 142 disposed on the control boards 130 and 140 to directly sense vibrations from the acceleration sensors 134 and 144 in the boards. In other respects, the configuration of the electronic device 100 in FIG. 9 is similar to the configuration of the electronic device 100 depicted in FIG. 1 and FIG. 2.

In a case of the configuration depicted in FIG. 9, the acceleration sensors 134 and 144 are attached to the control boards 130 and 140. Accordingly, processing for attaching an acceleration sensor on the side of the backboard 110 becomes unnecessary. In addition, the vibration sensing processing sections 132 and 142 are directly supplied with measurement values of the acceleration sensors bypassing the connectors, and thus it becomes possible to determine acceleration values more appropriately.

OTHER MODIFICATION EXAMPLES

Note that the embodiment explained thus far has been explained in detail in order to explain the present invention in an easy-to-understand manner, and the present invention is not necessarily limited to an embodiment including all the constituent elements explained. For example, whereas the present invention is applied to a storage apparatus including a plurality of drives in the example depicted in the embodiment mentioned above, the present invention may be applied to the other electronic devices.

In addition, only control lines and information lines that are considered to be necessary for explanation are depicted in the configuration diagram depicted in FIG. 3, all control lines and information line for a product are not necessarily depicted. Actually, it may be considered that almost all the constituent elements are interconnected.

In addition, the processing procedure depicted in the flowchart FIG. 4 also is an example, and, as long as the same processing results are produced, the processing order may be partially modified, or a plurality of processes may be executed simultaneously.

In addition, the control process depicted in FIG. 4 is executed by a program implemented on the vibration sensing processing section 132, and the vibration sensing processing section can cause a general-purpose information processing apparatus (microcomputer) to function by causing the general-purpose information processing apparatus to implement the relevant program. Regarding the program in this case, other than being prepared in a memory in an information processing apparatus as the vibration sensing processing section 132, it may be placed on a recording medium such as an external memory, an IC card, an SD card, or an optical disc, and may be transferred.

Furthermore, part or the whole of the vibration sensing processing section may be realized by dedicated hardware such as a field programmable gate array (FPGA) or an application specific integrated circuit (ASIC).

What is claimed is:

1. An electronic device in which a drive that stores data and a control board having disposed thereon a controller that controls data transfer between the drive and another apparatus are connected to each other via a connector, the electronic device comprising:

an acceleration sensor that senses occurrence of a vibration; and a vibration sensing processing section that controls a state of communication between the drive and the controller to temporarily stop data transfer performed by the drive, when the acceleration sensor has sensed an acceleration exceeding an upper-limit threshold, and causes the temporarily stopped data transfer to resume when the acceleration sensor has sensed an acceleration of equal to or lower than a lower-limit threshold.

2. The electronic device according to claim 1, wherein the vibration sensing processing section causes the controller to change the state of communication with the drive from a normal state to a data transfer stopped state, and to change the state of communication with the drive to the normal state at a time of resumption.

3. The electronic device according to claim 2, wherein, during the data transfer stopped state, a memory disposed on the control board accumulates data being transferred, and, after the resumption of the temporarily stopped data transfer, the data accumulated in the memory is transferred to the drive.

4. The electronic device according to claim 3, wherein the electronic device is stopped when it has become impossible for the memory to accumulate data.

5. The electronic device according to claim 1, wherein the drive and the control board are mounted on a backboard attached to a housing, and the acceleration sensor is disposed on the backboard.

6. The electronic device according to claim 1, wherein the drive and the control board are mounted on a backboard attached to a housing, and further, part of the control board is attached to the housing by a screw, and the acceleration sensor is disposed near a portion where the screw is attached on the control board.

7. The electronic device according to claim 1, wherein the vibration sensing processing section allows the upper-limit threshold and the lower-limit threshold to be modified.

8. An electronic device control method applied to an electronic device in which a drive that stores data and a control board having disposed thereon a controller that controls data transfer between the drive and another apparatus are connected to each other via a connector, the electronic device control method comprising:

a temporary stop process of temporarily stopping data transfer performed by the drive, when an acceleration sensed by an acceleration sensor that senses occurrence of a vibration exceeds an upper-limit threshold; and, after the temporary stop process, a resumption process of causing the temporarily stopped data transfer to resume when the acceleration sensor has sensed an acceleration of equal to or lower than a lower-limit threshold.

* * * * *